United States Patent [19]

Griswold

[11] Patent Number: 5,390,981
[45] Date of Patent: Feb. 21, 1995

[54] SEAT ASSEMBLY WITH A SINGLE POSITION MEMORY DUMP MECHANISM

[75] Inventor: Les Griswold, Ann Arbor, Mich.

[73] Assignee: Hoover Universal, Inc., Plymouth, Mich.

[21] Appl. No.: 128,729

[22] Filed: Sep. 30, 1993

[51] Int. Cl.⁶ .............................................. B60N 2/02
[52] U.S. Cl. ...................... 297/378.12; 297/362.14
[58] Field of Search ...................... 297/378.12, 362.14, 297/362.12

[56] References Cited

U.S. PATENT DOCUMENTS 4,502,730  3/1985  Kazaoka et al. ............... 297/378.12
4,660,886  4/1987  Terada et al. ................. 297/378.12
4,881,775  11/1989  Rees ............................. 297/362.14

Primary Examiner—F. Daniel Lopez
Attorney, Agent, or Firm—Harness Dickey & Pierce

[57] ABSTRACT

A vehicle seat assembly is provided with a single set position memory dump mechanism. The memory feature acts to lock the seat back in a predetermined set position upon return of the seat back from a forward dump position. The set position is rearward of the front use position of the seat back so as to provide a comfortable seat back position for all occupants rather than locking in the front most use position which is typically an uncomfortable position for most seat occupants.

10 Claims, 2 Drawing Sheets

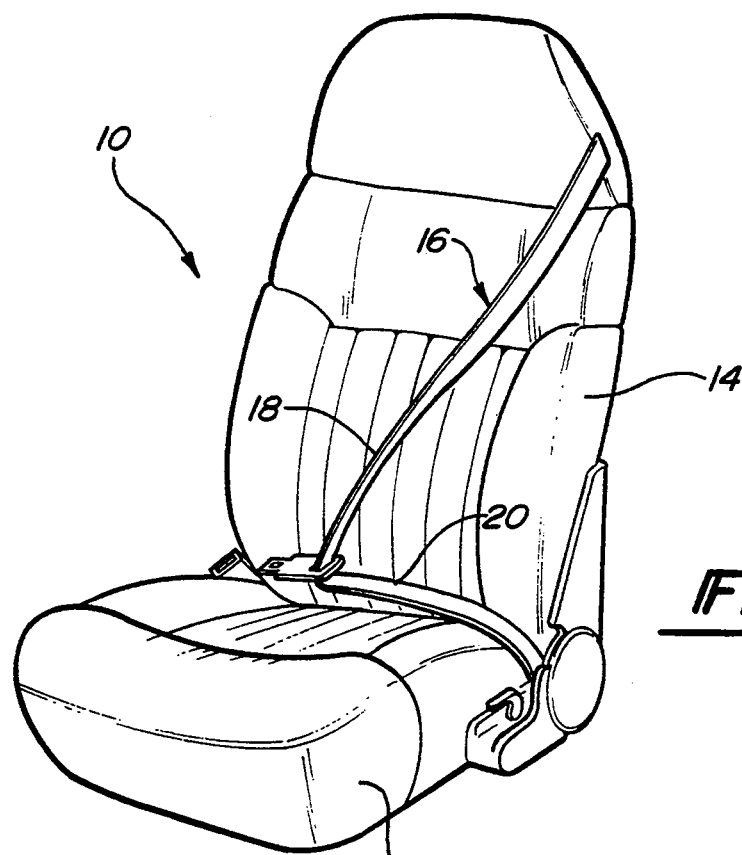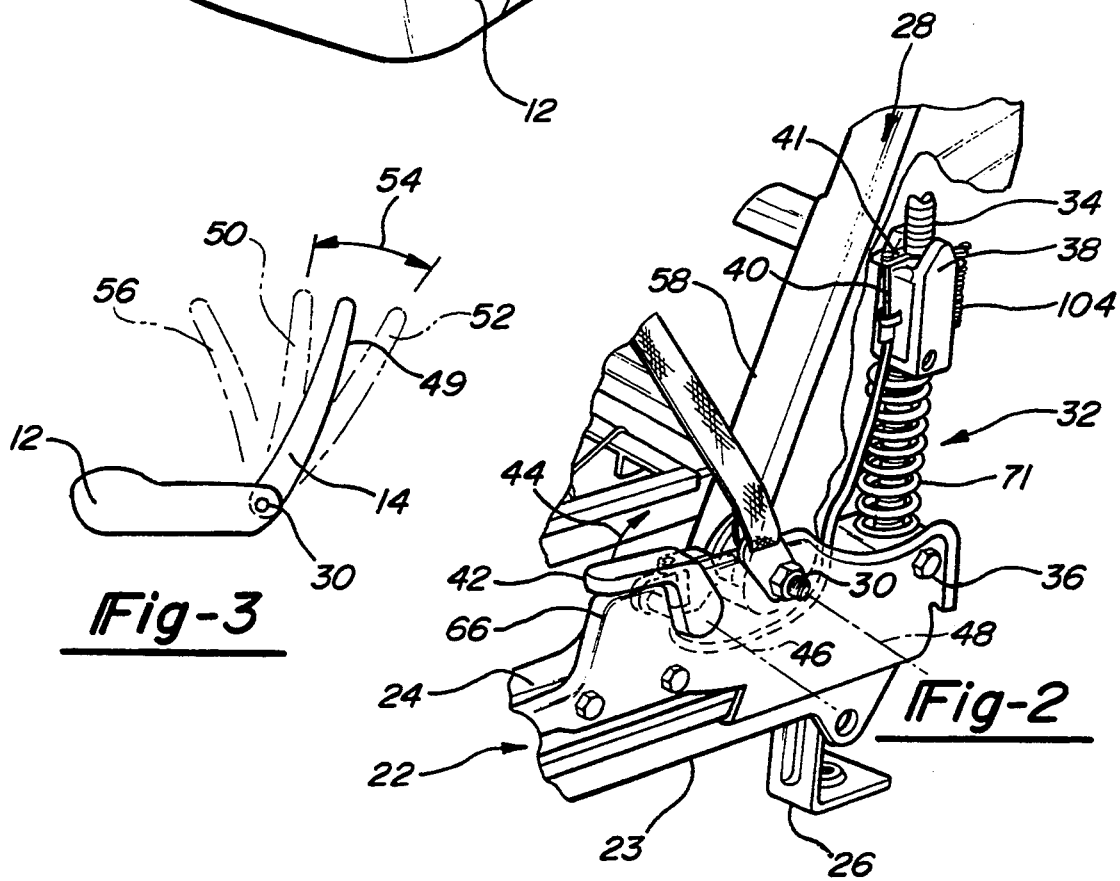

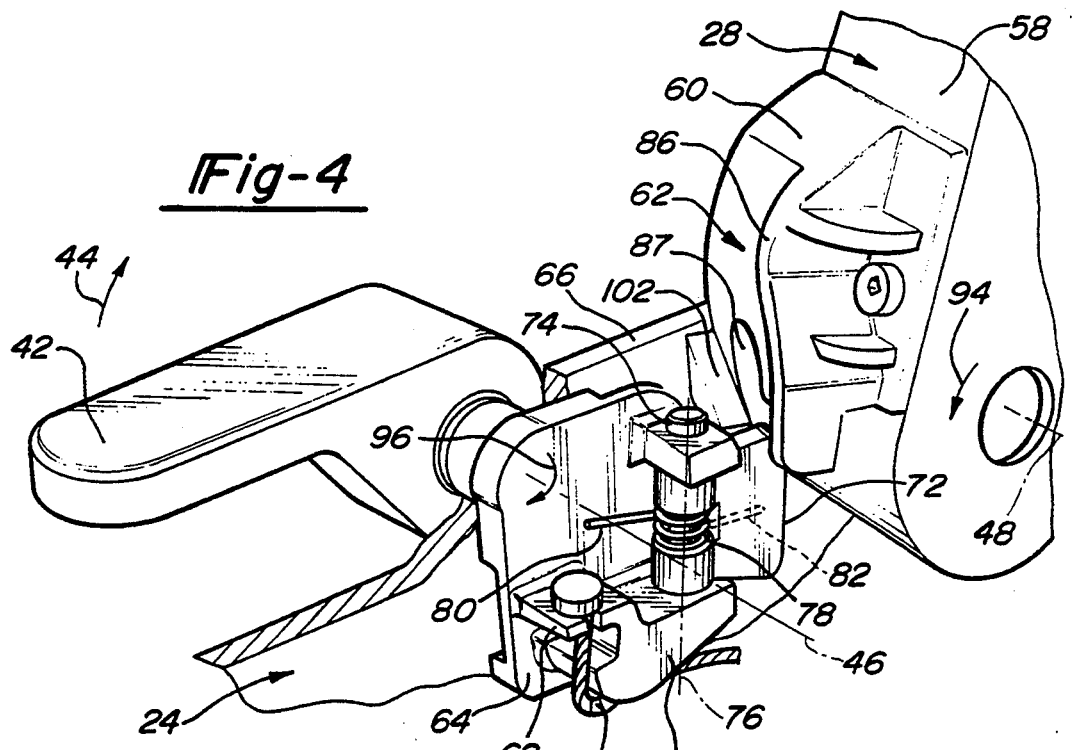
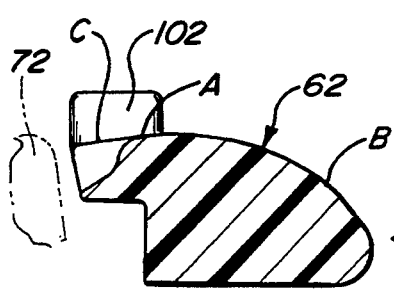
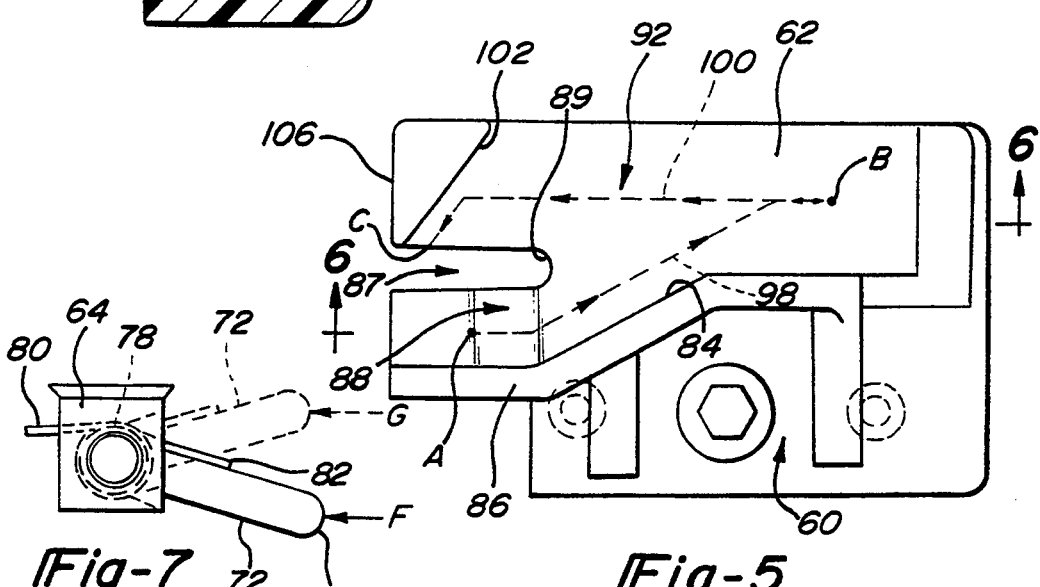

SEAT ASSEMBLY WITH A SINGLE POSITION MEMORY DUMP MECHANISM

BACKGROUND AND SUMMARY OF THE INVENTION

The present invention relates to a vehicle seat assembly and in particular to a seat assembly having a manually operated seat back recliner and a single position memory dump mechanism for locking the seat back in a predetermined set position upon return of the seat back from a forward dump position.

Vehicle seat assemblies, particularly those adapted for use in the front seat of a two-door motor vehicle, are often equipped with a dump feature that enables the seat back to be rotated about a transverse axis from a normal use position to a forward "dump" position to improve access to the rear seat area of the vehicle. In addition, many seat assemblies are equipped with a recliner mechanism that enables the angle of the seat back to be adjusted within a defined range of use positions. This range is bounded by a front use position and a rear use position. The recliner operates to lock the seat back in place to hold the seat back in the adjusted position. The dump feature typically operates upon release of the recliner to hold the recliner released, allowing the seat back to rotate forward.

For convenience while rotating the seat back to the forward dump position and during return of the seat back, most recliner mechanisms are typically held released so that they do not lock. By not locking, the seat back is free to rotate between the front use position and the dump position without the necessity of manually holding the recliner operating lever in a release position. Once the seat back has moved forward beyond the front use position, the recliner operating lever can be released. Return of the seat back to a use position is accomplished by merely pushing the seat back rearward.

Various approaches have been utilized in locking the seat back once it is returned to a use position. One approach is to lock the recliner when the seat back has been returned to the front use position. While this approach is simple, the seat back will lock in a position which is uncomfortable and which is awkward for most people to sit in the seat assembly.

Another approach has been to provide a full memory feature in which the recliner will only lock when the seat back has been returned to its adjusted use position prior to being dumped forward. Such a full memory feature, while being convenient for the user, is relatively complex and thus costly to produce.

It is an object of the present invention to provide a manual seat recliner with a single position memory which locks the seat back in a set position rearward of the front use position that is comfortable for most seat occupants.

The seat assembly of the present invention includes a cam mounted to the rotating seat back and a cam follower coupled to the recliner operating lever for holding the operating lever in the release position as the seat back is rotated forward to the dump position. The cam has a first surface portion engagable with the follower as the seat back is rotated from the front use position to the dump position and a second surface portion engagable with the follower as the seat back is returned from the dump position to the set position. Both surface portions of the cam are substantially concentric with the seat back pivot axis. The second surface portion has a greater circumferential or angular extent than the first portion, maintaining the follower in contact with the cam for a greater angular travel of the seat back. This increase in angular seat back travel is between the front use position and the set position, several degrees further rearward. As a result, the recliner does not lock the seat back until the seat back has been returned to the set position.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a seat assembly according to the present invention with a manual seat back recliner having a single position memory;

FIG. 2 is an enlarged perspective view of the lower rear portion of the seat assembly showing the seat frame structure;

FIG. 3 is a schematic side view of the seat assembly illustrating the various positions of the seat back;

FIG. 4 is a perspective view of the recliner and dump mechanism;

FIG. 5 is a front view of the cam mounted to the seat back frame;

FIG. 6 is a sectional view through the cam as seen from substantially the line 6—6 of FIG. 5; and FIG. 7 is a top view of the follower.

DETAILED DESCRIPTION OF THE EMBODIMENT

The seat assembly of the present invention with a manually operated recliner having a single position memory dump mechanism is shown in FIG. 1 and designated generally at 10. Seat assembly 10 includes a lower seat cushion 12 and a seat back 14 extending upwardly at the rear of the seat cushion in a conventional manner. The seat assembly also includes an integral restraint system 16 which forms a shoulder belt 18 and a lap belt 20 for restraining an occupant in the seat assembly 10.

A lower rear portion of a seat frame 22 is shown in FIG. 2. The seat frame 22 includes a lower track 23, an upper track 24, which moves fore and aft relative to the lower track, and a back portion 28. The lower track mounts directly to the vehicle body through the legs 26, only one of which is shown. The upper and lower tracks are collectively referred to as "base portion" of the seat frame 22. The frame back portion 28 is pivotally mounted to the upper track 24 by pin 30 for rotation about the axis 48 extending transversely of the seat assembly. The back portion 28 of the frame serves as the frame for the seat back 14. Back portion 28 includes an upright beam 58 along the side of the seat assembly carrying the shoulder belt 18. In FIGS. 1 and 2 that is the left side of the seat assembly with the seat assembly adapted for the driver's side of a vehicle.

The seat back includes a recliner mechanism 32 which is operable to hold the seat back in a given adjusted position. The recliner mechanism 32 includes a threaded lead screw 34 pivotally attached to the upper track 24 of the seat frame by bolt 36. A housing 38 is attached to the beam 58 of the seat frame back portion 28 and contains a spin nut (not shown) which is threaded onto the screw 34. Also contained within the housing 38 is a mechanism for locking the spin nut to prevent its rotation along the length of the lead screw, thus preventing the spin nut and housing from moving along the length of the screw 34. When the spin nut is locked in place, the seat back 14 is prevented from rotating about pivot axis 48.

A pull cable 40 is coupled to a pivot lever 41 on the housing 38 for releasing the recliner mechanism when pulled. This frees the spin nut, allowing it to rotate along the length of screw 34. The opposite end of the cable is operatively coupled to the recliner operating lever 42 rotatably mounted to the base portion of the frame. The operating lever 42 is rotatable about an axis 46, parallel to the axis 48 of the seat back pivot pin 30. Upon upward rotation of the operating lever 42 shown by the arrow 44, the cable 40 is pulled, releasing the recliner mechanism and enabling the seat back to rotate.

With reference to FIG. 3, various positions of the seat back 14 are shown. The seat back has a predetermined set or design position 49 shown in the solid line. The seat back is rotatable between a front use position 50 forward of the set position and a rear use position 52 rearward of the set position defining a range 54 of use positions therebetween. To improve access to the rear seat area of a motor vehicle behind the seat assembly 10, the seat back is rotatable forward from the range 54 to a forward dump position 56.

The recliner mechanism 32 is operable to lock the seat back 14 in a desired use position within the range 54 of use positions. The recliner mechanism may be infinitely variable in the selection of use positions or may have a plurality of finite use positions within the range. The particular nature of the recliner mechanism is outside the scope of the present invention. While the invention is described in connection with a linear recliner locking mechanism, other recliner locking mechanisms can be used with the single position memory dump mechanism.

The dump and memory mechanism operates when the seat back is rotated forward of the front use position 50 to hold the recliner mechanism released in the absence of manual manipulation of the recliner operating lever 42. Upon return of the seat back, the memory mechanism operates to re-engage the recliner mechanism, locking the seat back in place, upon return of the seat back to the set position 49, rearward of the front use position.

The dump and memory device is shown in greater detail in FIGS. 4–7. In these figures, a passenger side seat assembly is disclosed. This is opposite from the driver's side seat shown in FIGS. 1 and 2. The operating lever 42 is to the right side of the seat assembly rather than on the left side.

A cam 60 is attached to the upright member 58 near its lower end, near the pivot axis 48. The cam has a curved cam surface 62 which is concentric about the axis 48. The operating lever 42 has a pivot shaft that is splined to a cam follower mounting bracket 64 and mounted for rotation to the riser 66 of the seat frame upper track 24. The operating lever 42 and follower mounting bracket 64 rotate together about the axis 46 as the operating lever 42 is pulled upward in the direction of arrow 44 to release the recliner mechanism 32. The cable 40 is coupled to the mounting bracket 64 by the flange 68 and is routed under the curved lower surface 70 of the mounting bracket. When the operating lever is pulled upward, the cable 40 is pulled, releasing the spin nut within the housing 38 of the recliner mechanism allowing the seat back to rotate. A coil compression spring 71 surrounding the screw 34 urges the seat back forward when the recliner is released.

A cam follower 72 is mounted to the bracket 64 by pivot pin 74 for rotation about axis 76. The axis 76 is normal to the seat back pivot axis 48 so that as the follower rotates, the distal end 73 is moved axial relative to the pivot axis 48. A coil torsion spring 78 is positioned about the pivot pin 74 and has a first end 80 engaging the mounting bracket 64 and a second end 82 contacting the side of the follower 72 to bias the follower 72 in a clockwise direction as viewed from above. The follower 72 is forced by the spring 78 against the surface 84 of the wall 86 which rises from the cam surface 62. The follower is shown in FIG. 4 in a normal rest position with the seat back positioned in the range 54 of use positions. When the seat back is rearward of the front use position, the follower 72 is spaced from the cam surface 62.

A slot 87 extends into the cam from the bottom end 106 and provides a clearance for the cable 40 when the seat back is rotated forward to the dump position. The slot generally divides the cam surface 62 into two portions, a first surface portion 88 which lies to one side of the slot 87, below the slot in FIG. 5, and a second surface portion 92 which is on the opposite side of the slot, above it in FIG. 5. The two surface portions are displaced axially from one another relative to the axis 48. At the end 89 of slot 87, the first and second surface portions of the cam merge with one another. Both the first and second surface portions are concentric about the pivot axis 48. However, the second portion 92 is of a greater circumferential or angular extent than the first portion 88 as described below.

When the seat back is within the range of use positions 54, the follower is spaced from the cam surface 62. To dump the seat back forward, the operating lever 42 is rotated about the axis 46 which in turn rotates the follower 72 away from the cam surface 62. As the seat back rotates forward from the front use position, the cam will eventually contact the follower at point A on the cam surface. Once this contact has been made, the follower will maintain the operating lever 42 in a release position without the need for the seat user to manual hold the lever 42 in the released position. As the seat back continues to rotate forward to the dump position, the follower 72 will track along a path 98 shown in FIG. 5. The cam profile can be configured such that the cam contacts the follower at any desired position of the seat back between the front use position and the dump position.

The wall 86 of the cam has a portion inclined relative to axis 48 such that as the follower tracks along the path 98, the follower will be rotated about its axis 76, moving the follower end axially over the surface 62 into contact with the second surface portion 92 of the cam.

The distal end 73 of the follower 72 has a rounded surface which contacts the cam 60. With reference to FIG. 7, the follower is shown in solid line in its initial angular position when contact is first made with the cam during forward rotation of the seat back. The force exerted on the follower by the cam is shown by the vector F which is perpendicular to the follower surface and applies a clockwise torque to the follower 72. This force, together with the spring force from spring 78 holds the follower against the wall 86. When the follower is rotated by the wall 86 to the broken line position of the follower in FIG. 7, the force applied to the follower passes over the pivot center of the follower and is shown by the vector G. The resulting torque on the follower is now counterclockwise. This resists the force of the biasing spring 78 maintaining the cam in contact with the second surface portion of the cam.

The end of the follower path 98 is shown at point B. The follower reaches this point when the seat back is in the dump position. Upon rearward return of the seat back, the follower tracks along the path 100. As the seat back nears the set position, the follower contacts the wall 102. The wall 102 causes the follower to rotate toward its initial position, off the side of the second surface portion 92 of the cam at point C and into the slot 87. The second surface portion of the cam, between points B and C, has a greater angular extent then the first cam portion between points A and B. Point C is reached only after the seat back has been returned rearward, beyond the front use position, to the set position. Once the follower has dropped off the cam surface, the operating lever 42 is free to return to the latch position by operation of spring 104 on the housing 38 which applies a tension to the cable 40.

By forcing the follower 72 off the side of the cam, the possibility of a false locking condition is prevented. If the follower dropped off the end 106 of the cam, without the angled wall 102, a false locking condition may occur by partial rotation of the operating handle 42 sufficient to lock recliner mechanism and stop the seat back rotation but to not enough rotation of the lever to fully engage the recliner mechanism. By moving the follower off a side of the cam, such a false locking condition does not occur.

The seat assembly of the present invention thus provides a set position memory feature to the dump mechanism so that upon return of the seat back from the dump position, the seat back will not lock until it has been returned to this set position. The set position is rearward of the front use position of the seat back and in a position which is more comfortable for most seat occupants. From this position, the seat occupant can adjust the seat back to a desired position either forward or rearward of the set position.

It is to be understood that the invention is not limited to the exact construction illustrated and described above, but that various changes and modifications may be made without departing from the spirit and scope of the invention as defined in the following claims.

I claim:

1. A seat assembly for a motor vehicle having a seat cushion and a seat back extending upwardly from said seat cushion, said seat assembly comprising:
    a seat frame having a base portion adapted to be mounted to a motor vehicle and a back portion pivotally mounted to said base portion for rotation relative to said base portion about a transverse pivot axis, said back portion pivoting within a range of use positions bounded by a front use position and a rearward most use position, said back portion having a predetermined set position within said range of use positions rearward of said front use position and said back portion being rotatable to a forward dump position forward of said range;
    recliner latch means for holding said back portion in a selected position within said range of use positions;
    release means for selectively releasing said recliner latch means to enable rotation of said back portion whereby the position of said back portion within said range can be adjusted and said back portion can be rotated to said dump position, said release means including an operating lever coupled to said recliner latch means and being pivotally mounted to said base portion for rotation about a lever axis spaced from said pivot axis and being movable from a latch position to a release position for releasing said recliner latch means, said operating lever being biased into said latch position; and
    cam and follower means operatively associated with said operating lever and said back portion for holding said operating lever in said release position when said back portion is moved forward beyond said front use position toward said dump position until said back portion has been returned rearward to said predetermined set position, said cam and follower means including a follower coupled to said lever for rotation with said lever about said lever axis and a cam fixed to said back portion and engagable by said follower when said back portion is moved forward beyond said front use position toward said dump position to hold said lever in said release position until said back portion has been returned rearward to said predetermined set position.

2. The seat assembly of claim 1 further comprising:
    a pull cable connecting said lever to said recliner latch means for releasing said recliner latch means upon pulling of said cable by rotation of said lever to said release position.

3. The seat assembly of claim 1 wherein said cam has a cam surface concentric about said pivot axis.

4. The seat assembly of claim 3 wherein said cam surface has a first portion across which said follower moves as said back portion is moved forward from said front use position to said dump position and a second portion across which said follower moves as said back portion is moved rearward from said front use position to said predetermined set position.

5. The seat assembly of claim 1 wherein said follower is pivotally coupled to said lever for rotation relative to said lever about a follower axis normal to said lever axis.

6. The seat assembly of claim 5 wherein said follower is urged by said cam to rotate about said follower axis as said back portion is moved forward from said front use position to said dump position.

7. The seat assembly of claim 5 wherein said cam has a cam surface and said follower tracks along a first path on said cam surface as said back portion is rotated forward to said dump position and said follower tracks along a second path on said cam surface as said back portion is rotated rearward to said set position, said cam surface having a profile so that as said back portion rotates forward, said follower engages said cam at a position of said back portion forward of said front use position and as said back portion rotates rearward, said follower disengages from said cam when said back portion is rotated rearward to said set position.

8. The seat assembly of claim 1 wherein said cam has a cam surface concentric about said pivot axis and said follower is coupled to said lever for rotation about a follower axis normal to said pivot axis for rotation between first and second positions, said follower engaging said cam surface at a first contact point in said first position and after said back portion rotates forward, said follower rotating about said follower axis to said second position and when said back portion is returned to said set position, said follower disengaging said cam at a last contact point axially spaced from said first contact point relative to said pivot axis.

9. The seat assembly of claim 8 wherein follower has a curved end surface for engagement with said cam surface and a force applied to said follower by said cam surface acts normal to said curved surface and applies a torque on said follower about said follower axis in one direction, said follower rotating over center to said second position so that the force applied to said follower applies a torque on said follower in the opposite direction about said follower axis.

10. The seat assembly of claim 9 wherein said cam includes raised wall extending from said cam surface along one edge of said cam surface and further comprising bias means for rotating said follower toward and against said raised wall in said first position, said wall having a portion inclined to said pivot axis for moving said follower to said second position as said back portion is rotated forward.

* * * * *